Sept. 10, 1929.  J. L. MRAZ  1,727,895
TUBULAR JOINT AND METHOD FOR MAKING SAME
Filed April 2, 1927  2 Sheets-Sheet 1

INVENTOR
Joseph L. Mraz
BY
ATTORNEYS

Sept. 10, 1929.  J. L. MRAZ  1,727,895
TUBULAR JOINT AND METHOD FOR MAKING SAME
Filed April 2, 1927  2 Sheets-Sheet 2
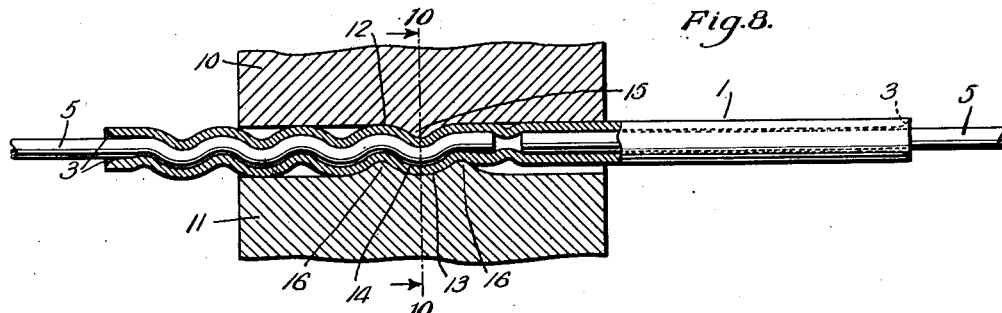
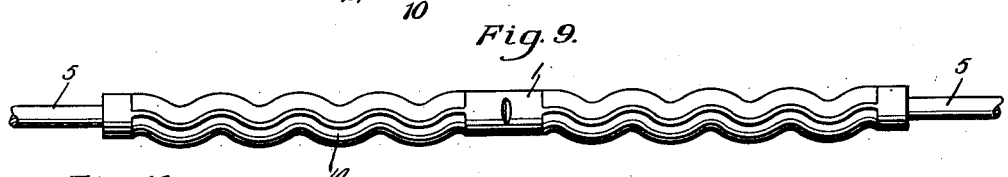
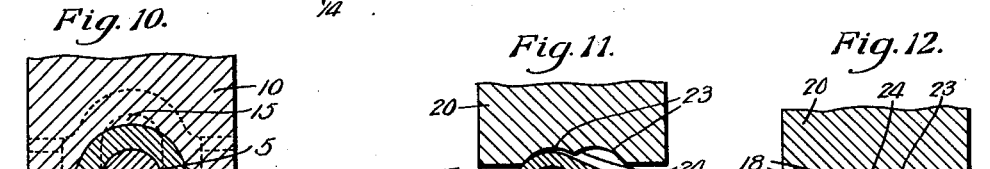
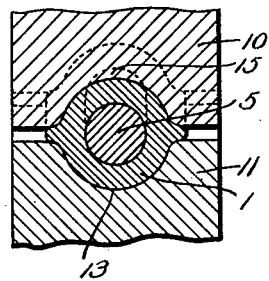
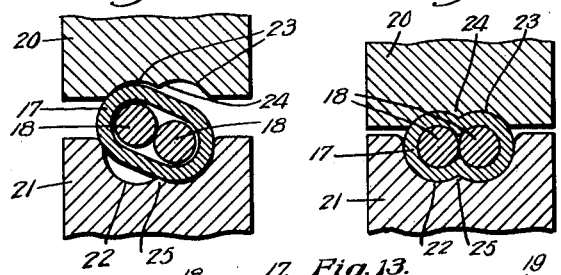
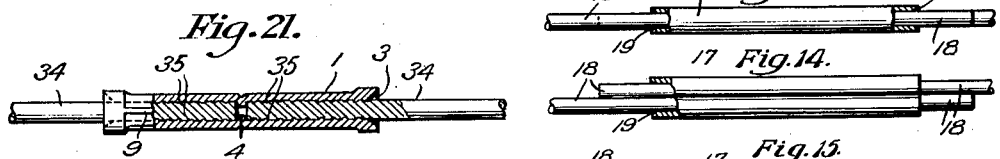
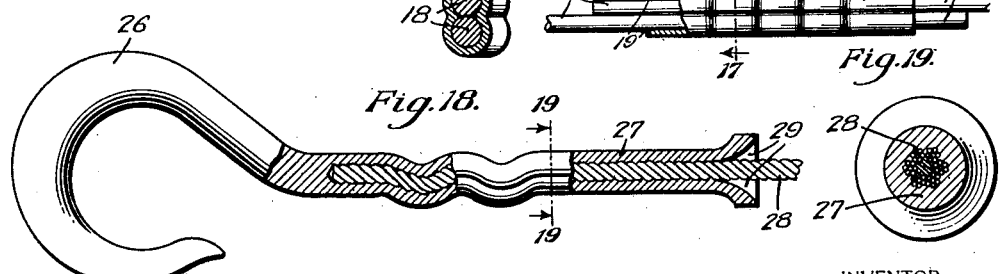
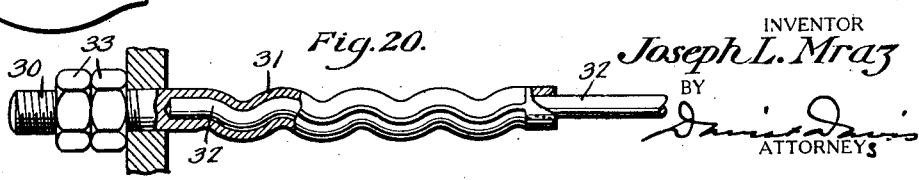
INVENTOR
Joseph L. Mraz
BY
ATTORNEYS Patented Sept. 10, 1929.

1,727,895

UNITED STATES PATENT OFFICE.

JOSEPH L. MRAZ, OF WATERBURY, CONNECTICUT.

TUBULAR JOINT AND METHOD FOR MAKING SAME.

Application filed April 2, 1927. Serial No. 180,390.

An important object of this invention is to provide a method of connecting a metal, tubular structure to a wire, stranded cable, rod or the like.

Another object of the invention is to provide a new and improved method of making a strong joint between the ends of two electric conductors without the use of solder.

Another object of the invention is to provide a simple, compact, close joint of great tensile strength between a tubular, metal structure and a wire, stranded cable, rod or the like.

Figure 3:
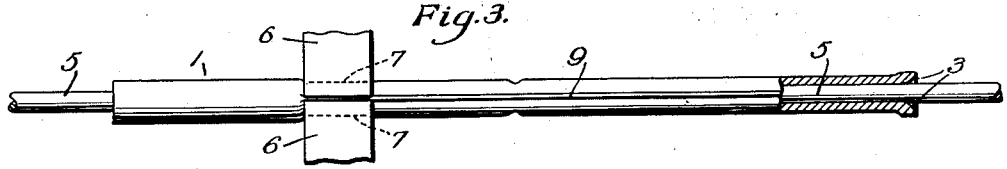
Figure 4:
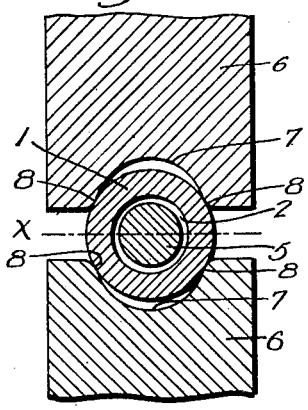
Figure 5:
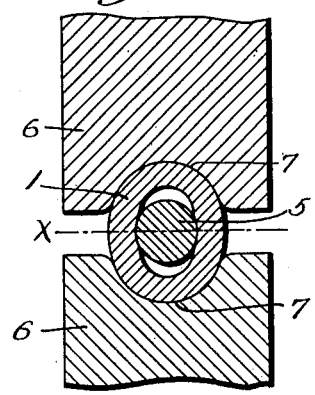
Figure 6:
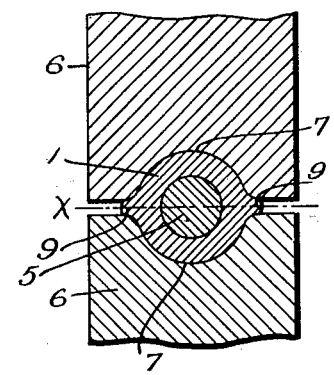
Figure 7:
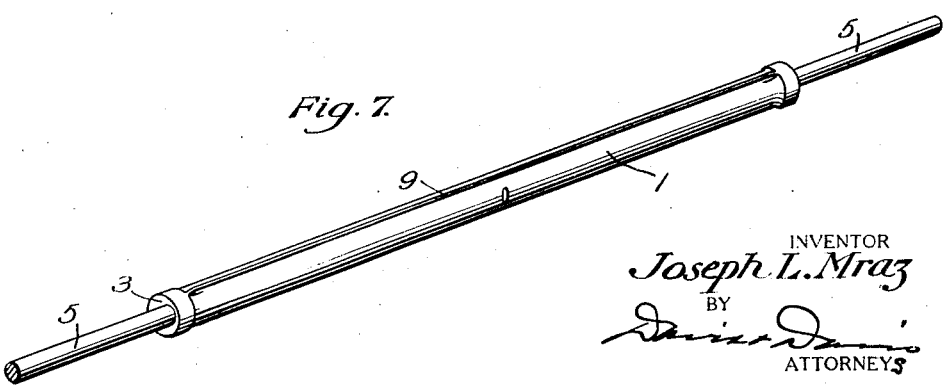

Fig. 3 a similar view showing the operation of compressing the sleeve;

Figs. 4, 5 and 6 enlarged cross-sectional views showing different stages of the compressing operation;

Fig. 7 a perspective view of the finished joint;

Fig. 8 a sectional view showing the operation of forming another form of joint;

Fig. 9 a side view of the finished joint;

Fig. 10 a cross section taken on the line 10—10 of Fig. 8;

Figs. 11 and 12 cross-sectional views showing the manner of forming a joint between two overlapped wires;

Fig. 13 a side view of said lap joint partly broken away;

Fig. 14 a plan view thereof;

Fig. 15 a side view of another form of lap joint;

Fig. 16 a plan view thereof;

Fig. 17 an enlarged cross section taken on the line 17—17 of Fig. 16;

Fig. 18 a side view partly in section, showing my invention embodied in an anchoring connection for a wire cable;

Fig. 19 an enlarged cross section taken on the line 19—19 of Fig. 18;

Fig. 20 a side elevation, partly in section, of another embodiment of my invention; and Fig. 21 a sectional view of still another joint structure.

To form one of my improved joints between two electric wires, I first provide a tubular connector sleeve 1 of cylindrical form. This sleeve is preferably formed of copper although any suitable material may be used. The bore or passage 2 through the sleeve is slightly larger in diameter than the wires which are to be connected together, and the ends of said bore flare outwardly as at 3 to form bell-shaped entrances for the wires. Midway its ends the sleeve is indented at opposite sides to form two opposed abutments 4 extending into the passage 2.

Figure 2:
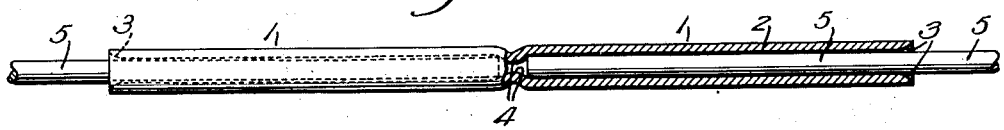
Fig. 2 is a side view partly in section, showing the electric wires inserted into the sleeve.

The ends of the circuit wires 5 are inserted into the opposite ends of the passage 2 and are thrust through the passage until they bottom against the abutments 4 as shown in Fig. 2. The tube is next compressed about the wires in a manner to intimately and permanently unite it with them. This compression is performed by two die members 6 which are engaged with opposite sides of the tube as shown in Fig. 3. Although I have shown die members in the form of blocks they may be of any other suitable form, as rollers, for example. Also, one die member may be in the form of a long support for the wire and the other member in the form of a roller. The cross-sectional form of these die members is shown in Figs. 4, 5 and 6. Each member is formed with a straight groove 7. The surface of this groove is substantially semi-cylindrical and in cross section it describes an arc slightly less than a semi-circle. This arc is struck with a radius slightly less than the radius of the cross section of the cylindrical tube 1 which is to be operated upon by the die members. Therefore when the die members are brought into engagement with the cylindrical surface of the tube only the edges 8 of the grooves 7 will contact with the tube, as shown in Fig. 4. The edges 8 are rounded and their points of contact with the tube are spaced equally above and below the tranverse center line "x" extending horizontally through the tube.

The die members are next pressed toward each other. The resultant transverse pressure transmitted to the tube by the die edges 8 as the members approach each other causes the tube to be compressed in substantially the direction of the line "x", and forces it tightly against the enclosed wire at diametrically opposite points thereof. This compression distorts the tube into an elliptical cross-sectional form, as shown in Fig. 5, and causes it to closely fit the die grooves 7. As the movement of the die members continues, therefore, the tube will be subjected to the pressure of the entire surfaces of the grooves and will be compressed in a direction substantially at right angles to the direction of the first compression and force the tube into contact with the wire around the entire circumference thereof. During the final portion of the die movement it will be observed that almost the entire cross section of the tube is confined between the surfaces of the die grooves 7 and the enclosed wire. The metal of the tube will, therefore, be subjected to a compression which will force it into intimate, permanent, binding contact with the entire circumference of the wire. During this final compression of the tube metal it is left free for a narrow space between the compressing die members to permit of a slight transverse deformation or "upsetting" of the metal outwardly in the direction of the line "x". This deformation takes the form of two narrow ribs 9 extending longitudinally along the tube. When the compression is completed the tube is again of cylindrical form but its diameter is now reduced. The pressure has molded the metal of the tube around the circumference of the wire. Heat is generated in the metal by the pressure and consequently when the tube cools it contracts into a still stronger binding engagement with the enclosed wire. The die members may be forced together either by sustained pressure or by blows.

The die members are shifted along the tube and a series of compressing operations are performed until substantially the entire length of the tube has been compressed. The end portions of the tube are, however, left uncompressed in order to avoid crushing the flared entrances 3. These flared surfaces are provided not only to facilitate the insertion of the wires but also to avoid sharp corners and permit the wires to bend without any biting action at the points where they emerge from the tube. When the wire and the tube have been united as described the tube becomes in effect a permanent, integral part of the wires and the electrical conductivity of the joint will be equal to that of a continuous wire. The conductivity cannot be reduced in any way. The joint is substantial and the sleeve is so intimately united with the wire as to entirely exclude moisture from the interior of the joint.

Figure 1:
Fig. 1 is a side view of the joint sleeve.

In Figs. 8, 9 and 10 I have illustrated a manner of forming a joint having great tensile strength in addition to possessing all of the advantages of the straight joint just described. A tube of the form shown in Fig. 1 is used in forming this joint also and the wires 5 are inserted into said tube as shown in Fig. 2. I now operate upon the tube by die members 10 and 11, having substantially the same cross sectional form as the members 6 but differing from them in longitudinal section. The groove surfaces 12 and 13 of the die members 10 and 11 respectively are formed in longitudinal section to force a portion of the tube and the enclosed portion of the wire out of alinement with the longitudinal center line or axis of the joint and form a curved bend 14 therein. To accomplish this, one of the die members is formed with a bending hump 15 and the other member is formed with two humps 16 equally spaced at opposite sides of a center line through the hump 15. The sides of the hump 15 are curved longitudinally to merge with the groove surface 12 and the sides of the spaced humps 16 are curved to merge with the groove surface 13. The die members are thus formed to give a curved form to the bend 14 and to merge the bend evenly with the remainder of the tube.

Simultaneously with the bending operation the tube is compressed about the enclosed wire to give the joint the same cross sectional form as that of the previous joint, the bending humps of the die members and the adjacent groove surfaces being formed to accomplish this, as shown in Fig. 10. Outwardly of the bending humps the groove surfaces of the two die members extend longitudinally in parallel lines spaced apart sufficiently to avoid crushing adjacent portions of the tube during a bending and compressing operation. The performance of the compressing operation simultaneously with the bending of the tube is a very desirable feature of the method. The compression of the tube prevents it from splitting under the bending stress, by ironing out the metal of the tube and maintaining the continuity of its outer surface. It also holds the tube in close contact with the entire enclosed surface of the wire as both are bent.

The die members are advanced along the tube to perform a series of these bending and compressing operations and form a series of the bends 14 at either side of the longitudinal center of the joint. Each bend merges with the next in the series so that the series presents a continuous, even, wave-like form. The degree to which the tube and wire are bent out of alinement with the joint axis will vary according to different requirements and according to the wire and tube sizes and the materials used. The die members are chosen to give the desired depth and length to the bend. This wave-like joint positively anchors the wires to the connecting tube and possesses a greater tensile strength than the wire alone. It also excludes moisture from its interior as effectually as the straight joint. Both joints are formed entirely without solder. The manner of intimately uniting the inner surface of the tube continuously with the enclosed surface of the wire provides a closed joint of high-electrical conductivity without the use of any cementing material. It costs little to prepare the sleeve for connection and requires very little equipment for making the joint. In many cases the compression operations may be performed by hand pliers designed for the work. Another practical advantage is that it requires less skinning of the insulation from an insulated wire than in the case of an ordinary overlapped and soldered joint and needs less insulation to cover it when the connection is made.

In Figs. 11 to 14 I have shown the construction of a joint for connecting two overlapped wires. A straight elongated sleeve 17 is here used. This sleeve is sufficiently elongated or oblong in cross section to accommodate two wires 18 side by side. The ends of the passage through the sleeve are flared outwardly as at 19. The sleeve is compressed by means of two die members 20 and 21. The member 21 is formed with a relatively deep groove 22. The width of the groove is slightly less than the major width of the sleeve. The sleeve and its enclosed wires are placed diagonally within the groove 22 with one end of the cross section of the sleeve in the bottom of the groove and the other end projecting out of the groove as shown in Fig. 11. The die member 20 is formed with two shallow grooves 23 side by side and separated by a longitudinal rib 24. The member 21 is formed with a similar rib 25 at the bottom of the groove 22. One of the grooves 23 is engaged with the projecting portion of the diagonally disposed sleeve 17 and the die members are pressed together. This pressure will force the sleeve 17 entirely into the groove 22 and the sleeve will be laterally compressed between the opposite side walls of the groove and opposite sides of the sleeve will be forced into tight engagement with the enclosed wires. As the sleeve descends into the groove 22 the ribs 24 and 25 of the die members, by their engagement with the portions of the sleeve extending between the wires, prevent the sleeve from expanding at these points under the stress of the said lateral compression and force the metal of the sleeve inwardly between the wires. When the sleeve has been forced against the bottom of the groove as shown in Fig. 12 its cross section is almost entirely surrounded by the opposed die faces and a compression thereof will force the metal of the sleeve into intimate, binding engagement with the enclosed wires around substantially three-quarters of their circumference.

In Fig. 15 a modification of the lapped wire joint is shown. In this case the joint is compressed and formed with wave-like bends similar to those in the joint shown in Fig. 9 in order to give it greater tensile strength.

These joint structures have a great field of utility outside of their use in forming electrical connections. This is particularly true of the forms shown in Figs. 7 and 9. In Fig. 18 I have shown an adaptation of the compressed joint structure to connect an anchor hook to an automobile towing cable. The hook 26 is formed with a tubular shank 27 which receives the end of the cable 28. This shank is compressed in the same manner as the tube 1 to intimately contact with the cable strands as shown in Fig. 19. Several bends are formed in the shank to strengthen the anchorage of the cable with it. At its ends the shank is bell-shaped as at 29 to permit the cable to bend without injury at this point. Such a joint between the hook and cable is cheap, neat in appearance, and possesses maximum strength. The irregular surface of the cable is filled in by the metal of the tube which is molded around it and provides a strong grip between the cable and the shank of the hook.

Another adaptation of the invention is shown in Fig. 20. A bolt 30 is formed with a tubular extension 31 into which a wire strand 32 is inserted. The tube is compressed about the strand and bent as in the case of the joints previously described, to make a strong joint. Upon the threaded end of the bolt one or more nuts 33 are screwed. This structure is particularly well adapted for anchoring the tension wires of an airplane.

In Fig. 21 is shown a joint formed by the sleeve 1 and two wires or rods 34. The surfaces of these wires enclosed in the sleeve have been roughened as at 35 to increase their grip. This roughness may be produced by nicking, rasping with a file, knurling, or forming threads or rings upon the wires. The sleeve is compressed as previously described to mold its metal into intimate contact with the roughened surfaces 35 and produce a joint having great tensile strength. This structure is particularly adapted for a short joint. Owing to the better grip provided by the irregular surface 35 a comparatively short sleeve may be used.

What I claim is:

1. The method of forming a joint consisting in inserting one end of a metal strand into a metal tube; compressing said tube in a transverse direction to distort it and force it into close contact with the enclosed strand at two diametrically opposite points thereof; rigidly holding the tube in said close contact with the strand; and applying a transverse pressure to the tube in a direction substantially at right angles to the direction of the first compression to compress the metal of the tube and force it into close binding contact with the strand around the entire circumference thereof.

2. The method of forming a joint consisting in inserting one end of a metal strand into a metal tube; compressing said tube in a transverse direction to distort it and force it into close contact with the enclosed strand at two diametrically opposite points thereof; rigidly holding the tube in said close contact with the strand; applying a transverse pressure to the tube in a direction substantially at right angles to the direction of said first compression to compress the metal of the tube and force it into close binding contact with the entire circumference of the strand; and permitting outward transverse distortion of the compressed metal of the tube, under the stress of said second pressure, through areas of relatively slight width extending longitudinally upon the outer surface of the tube at opposite sides thereof.

3. The method of forming a joint consisting in inserting one end of a metal strand into a metal tube; compressing said tube in a transverse direction to distort it and force it into close contact with the enclosed strand at two diametrically opposite points thereof; rigidly holding the tube in said close contact with the strand; applying a transverse pressure to the tube in a direction substantially at right angles to the direction of said first compression to compress the metal of the tube and force it into close binding contact with the strand around the entire circumference thereof; and forming a bend in the compressed portion of the tube and the enclosed strand.

4. The method of forming a joint consisting in inserting one end of a metal strand into a metal tube; compressing said tube in a transverse direction to distort it and force it into close contact with the strand at two opposite sides thereof; rigidly holding the tube in said close contact with the strand; applying a transverse pressure to the tube in a direction angularly spaced around the tube axis from the direction of said first compression to compress the metal of the tube and force it into close binding contact with the entire circumference of the strand; and bending the compressed portion of the tube and the enclosed strand out of alinement with their longitudinal center line simultaneously with the compression of the tube.

5. The method of forming a joint consisting in inserting one end of a strand of material into a metal tube; compressing said tube in a transverse direction to force it into close contact with one side of the enclosed strand; rigidly holding the tube in said contact with the strand; and applying a transverse pressure to the tube in a direction substantially at right angles to the direction of said first compression to force it into close binding engagement with the strand around one half the circumference thereof.

6. The method of forming a joint consisting in inserting one end of a metal strand into a metal tube; compressing said tube in a transverse direction to distort it and force it into close contact with the enclosed strand at two diametrically opposite points thereof; rigidly holding the tube in said contact with the strand; applying transverse pressure, directed at an angle to the direction of said first compression, to the tube around most of the outer circumference thereof to compress the metal of the tube and force it into close binding engagement with the entire circumference of the strand; and permitting transverse outward deformation of the tube through a relatively small portion of the tube circumference, under the stress of said second pressure.

7. The method of forming a joint consisting in inserting one end of a strand of material into a metal tube; compressing said tube transversely around substantially its entire circumference to force the metal thereof into intimate binding contact with the circumference of the enclosed portion of the strand; and forming a bend in the tube and the enclosed strand simultaneously with the compression of the tube.

8. A joint structure comprising a metal tube open and flaring at one end; anchoring means carried by the opposite end of the tube; and a metal strand extending into the open end of the tube a material distance, the metal of the tube being compressed into intimate, binding contact with substantially the entire circumference of the enclosed strand by pressure applied to substantially the entire outer circumference of the tube, and the tube and strand being bent out of alinement with their axis intermediate the ends of the tube.

9. A joint structure comprising a metal tube open at one end; and a metal strand extending into the open end of the tube a material distance, the metal of the tube being compressed into intimate, binding contact with substantially the entire circumference of the enclosed strand by pressure applied to substantially the entire outer circumference of the tube, and the tube and strand being bent out of alinement with their axis intermediate the ends of the tube.

10. The method of forming a joint, consisting in inserting one end of a strand into a metal tube; inserting the tube and enclosed strand between compressing dies; compressing the tube in a transverse direction to distort and force it into close contact with the strand at two opposite sides thereof, rigidly holding the tube in said close contact with the strand, and applying a transverse pressure to the tube in a direction angularly spaced around the tube axis from the direction of said first compression, all by a single closing movement of the dies, to compress the metal of the tube and force it into close binding contact with the entire periphery of the strand.

11. The method of forming a joint, consisting in inserting one end of a strand into a metal tube; inserting the tube and enclosed strand between compressing dies; compressing the tube in a transverse direction to distort and force it into close contact with the strand at two opposite sides thereof, rigidly holding the tube in said close contact with the strand, applying a transverse pressure to the tube in a direction angularly spaced around the tube axis from the direction of said first compression, and forming a wave-like bend in the compressed tube and enclosed strand, all by closing movement of the dies, to compress the metal of the tube and force it into close binding contact with the entire periphery of the strand along said bend.

12. A joint structure comprising a metal tube open at one end; and a metal strand extending into the open end of the tube a material distance, the tube and enclosed strand being formed with a wave-like bend intermediate the ends of the tube and the metal of the tube being compressed and molded into intimate binding engagement with the entire periphery of the strand entirely along and adjacent said bend by pressure applied to substantially the entire outer periphery of the tube.

13. The method of forming a joint, consisting in inserting one end of a metal strand into one end of a metal tube; and transversely compressing the tube to form a wave-like bend in the tube and enclosed strand and to compress and mold the metal of the tube into intimate binding contact with the entire periphery of the strand along the length of said bend.

In testimony whereof I hereunto affix my signature.

JOSEPH L. MRAZ.